(12) United States Patent
Chen et al.

(10) Patent No.: US 6,770,125 B2
(45) Date of Patent: Aug. 3, 2004

(54) REVERSIBLE THERMOCHROMIC COMPOSITION

(75) Inventors: Peen-Taurn Chen, Chung Ho (TW); Chon-Yu Chen, Chung Ho (TW); Chung-Hsin Wu, Chung Ho (TW); Jen-Yi Chio, Chung Ho (TW)

(73) Assignee: New Prismatic Enterprise Co., Ltd., Taipei Hsien (TW)

( * ) Notice: Subject to any disclaimer, the term of this patent is extended or adjusted under 35 U.S.C. 154(b) by 2 days.

(21) Appl. No.: 10/274,346

(22) Filed: Oct. 17, 2002

(65) Prior Publication Data

US 2003/0121448 A1 Jul. 3, 2003

(51) Int. Cl.[7] .............................................. C09D 11/00
(52) U.S. Cl. .................................................... 106/31.18
(58) Field of Search ...................... 106/31.18

(56) References Cited

U.S. PATENT DOCUMENTS

| | | | | |
|---|---|---|---|---|
| 5,585,425 A | * | 12/1996 | Kito et al. | 524/324 |
| 5,688,592 A | * | 11/1997 | Shibahashi et al. | 428/323 |
| 5,873,932 A | * | 2/1999 | Fujita et al. | 106/31.18 |
| 5,879,438 A | * | 3/1999 | Fujita et al. | 106/31.18 |
| 6,048,387 A | * | 4/2000 | Shibahashi et al. | 106/31.21 |
| 6,524,377 B2 | * | 2/2003 | Torii et al. | 106/31.18 |
| 2002/0063244 A1 | * | 5/2002 | Nakashima et al. | 252/586 |

\* cited by examiner

*Primary Examiner*—Mark L. Bell
*Assistant Examiner*—Veronica F. Faison
(74) *Attorney, Agent, or Firm*—Pro-Techtor International Services

(57) ABSTRACT

A reversible thermochromic composition with light fastness feature comprises (a) an electron-donating color former, (b) an electron-accepting compound represented by Formula I,

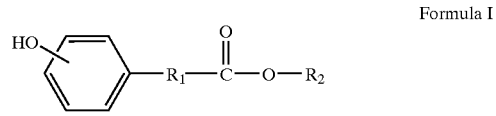

Formula I wherein $R_1$ represents a straight-chain or a branch-chain alkyl group having 1 to 3 carbon atoms, $R_2$ represents an alkyl group, an aromatic group or a heterocyclic group having 1 to 14 carbon atoms, (c) a solvent including an alcohol, ester, ether, ketone, carboxylic acid or acid amide, and (d) a light stabilizer. The reversible thermochromic composition can be encapsulated in microcapsules. Furthermore, the reversible thermochromic compositions undergoes reversible metachromatism at a temperature of −50° C. to 80° C.

18 Claims, No Drawings

REVERSIBLE THERMOCHROMIC COMPOSITION

BACKGROUND OF THE INVENTION

1. Field of Invention

This invention relates to a thermochromic composition and an electron-accepting compound, which has a good sensitivity as metachromatizing temperature change.

2. Description of Related Art

With regard to reversible thermochromic compositions capable of causing reversible metachromatism In a specific temperature range upon electron-donating/accepting reaction,.some proposals are disclosed In, e.g., U.S. Pat. Nos. 4,028,118, 4,138,357, and 4,425,161.

In the present, several materials or compositions were known as reversible thermochromic material such as (1) materials utilizing a crystal of a metal complex, (2) materials utilizing a cholesteric liquid crystal, (3) compositions having as three constituents thereof an electron-donating color former, a chemical compound having a phenolic hydroxyl radical and a chemical compound having an alcoholic hydroxyl radical, (U.S. Pat. Nos. 2,324,671, 3,560,229, and 4,028,118), and (4) compositions containing a polyhydroxy compound, an alkali metal salt of boric acid and a pH indicator.

Of these reversible thermochromic materials, (1) the one using a crystal of metal complex is superior in heat resistant and light resistant properties and is partly utilized for industrial use, but its metachromatizing temperature is higher than room temperature and it further has the defect that its chromic hue is limited. (2) Cholesteric liquid crystals are used for thermometers, ornaments and daily necessaries, but its metachromatizing temperature cannot be freely selected and also it is expensive and has the defect that its metachromatism life is short. (3) The combination of an electron-donating color former and 2,2-bis-(4-hydroxyphenyl)propane (hereafter called bis-phenol A) is widely used in stationeries, toys, clothing and the like, but its usage is limited because of its poor light resistance, and (4) the combination of a polyhydroxy compound, an alkali metal salt of boric acid and a pH indicator has the problem that its usage is limited because its metachromatism temperature is high and some time is required for it to chromically respond to temperature change.

SUMMARY OF THE INVENTION

It is an object of the invention to produce a reversible thermochromic composition excellent in terms of developing color density resulting from thermochromic transition.

It is another object of the Invention to produce an encapsulated thermochromic composition suited for effective utilization of other Industry fields.

In accordance with the foregoing and other objectives of the present invention, the present invention provides a reversible thermochromic composition comprising (a) an electron-donating color former, (b) an electron-accepting compound represented by Formula I

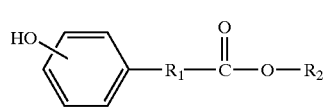

Formula I wherein $R_1$ represents a straight-chain or a branch-chain alkyl group having 1 to 3 carbon atoms, $R_2$ represents an alkyl group, an aromatic group or a heterocyclic group having 1 to 14 carbon atoms, (c) a solvent comprising alcohol, amide, ester, ether, or ketone, (d) a light stabilizer. The components mentioned above are enclosed in a microcapsule. Furthermore, the reversible thermochromic composition undergoes reversible metachromatism at a temperature within the range of −50° C. to 80° C.

It is to be understood that both the foregoing general description and the following detailed description are by examples, and are intended to provide further explanation of the invention as claimed.

DESCRIPTION OF THE PREFERRED EMBODIMENTS

Reference will now be made in detail to the present preferred embodiments of the invention. The reversible thermochromic composition of the present invention has the following essential components (a) to (d).

Component (a): an electron-donating color former;

Component (b): an electron-accepting compound mentioned above which represents by Formula I;

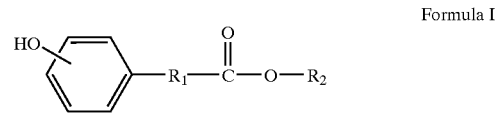

Formula I

Component (c): a compound serving as a reaction medium capable of reversibly causing electron-donating/accepting reaction; and Component (d): a stabilizer capable of providing good light fastness of the thermochromic composition.

Examples of the component (a), an electron-donating color former, which can be used in the practice of the invention, may include conventionally known the following: Diarylphthalides such as crystal violet lactone, malachite green lactone and 3-(4-diethylaminophenyl)-3-(1-ethyl-2-methylindol-3-yl)phthalide, etc.; Polyarylcarbinols such as Michler's hydrol, crystal violet carbinol, and malachite green carbinol, etc.; Leucoauramines such as N-(2,3-dichlorophenyl)leucoauramine, N-benzoylauramine, N-acetylauramine, and N-phenylauramine, etc.; Rhodamine B lactams such as Rhodamine B lactam etc., Indolines such as 2-(phenyliminoethylidene 3,3-dimethylindoine, etc.; Spiropyrans such as N-3,3-trimethylindolinobenzospiropyran, and 8-methoxy-N-3,3-trimethylindolinobenzospiropyran, etc.; and Fluorans such as 3-diethylammo-6-methyl-7-chlorofluoran, 3-diethylaroino-7-methoxyfluoran, 3-diethylamino-6-benzyloxyfluoran, 3-amino-5-methylfluoan, 2-methyl-3-amino-6,7-dimethylfluoran, 2-bromo-6-cyclohexylaminofluoran, 2-(o-chlorophenylamino)-6-dibutylaminofluoran, 1,3-dimethyl-6-diethylaminofluoran, 3,6-diphenylaminofluoran, 1,3-diethylamino-6-methyl-7-chlorofluoran, and 1.3-diethylaminobenzofluoran, etc.

Component (b) compounds of the present invention represented by the general Formula I

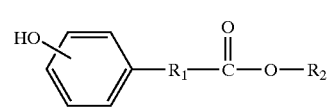

Formula I wherein $R_1$ represents a straight-chain or branched alkyl group having 1 to 3 carbon atoms, $R_2$ represents an alkyl group, an aromatic group or a heterocyclic group. The formula I also called hydroxyphenylalkyl acid esters can be easily synthesized by the condensation of hydroxyphenylalkylcarboxylic acids; the alkyl group having 1 to 3 carbon atoms with alkyl alcohols, aromatic phenols, or heterocyclic phenols. The preferred examples which can be used in the practice of the invention, are shown below:

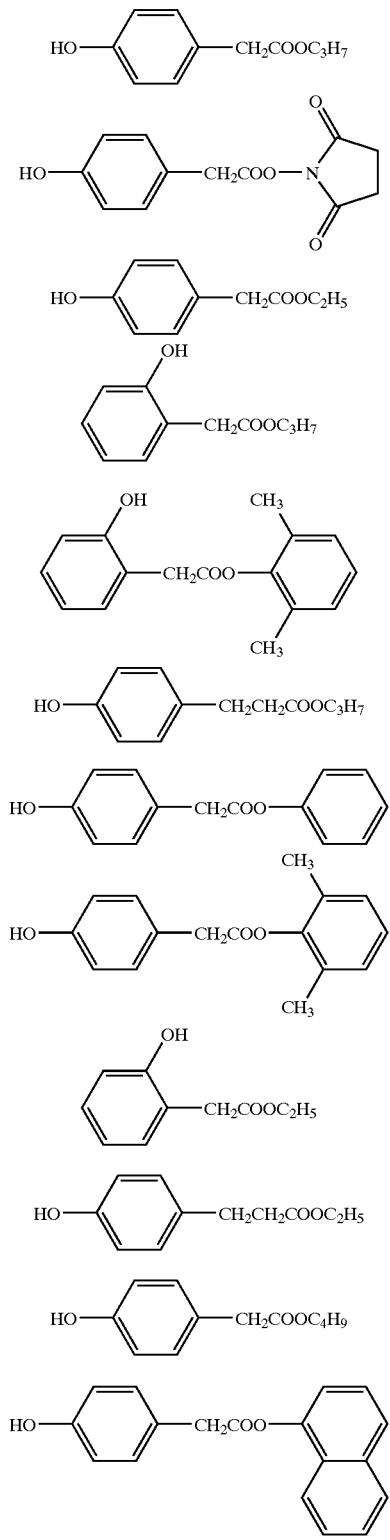

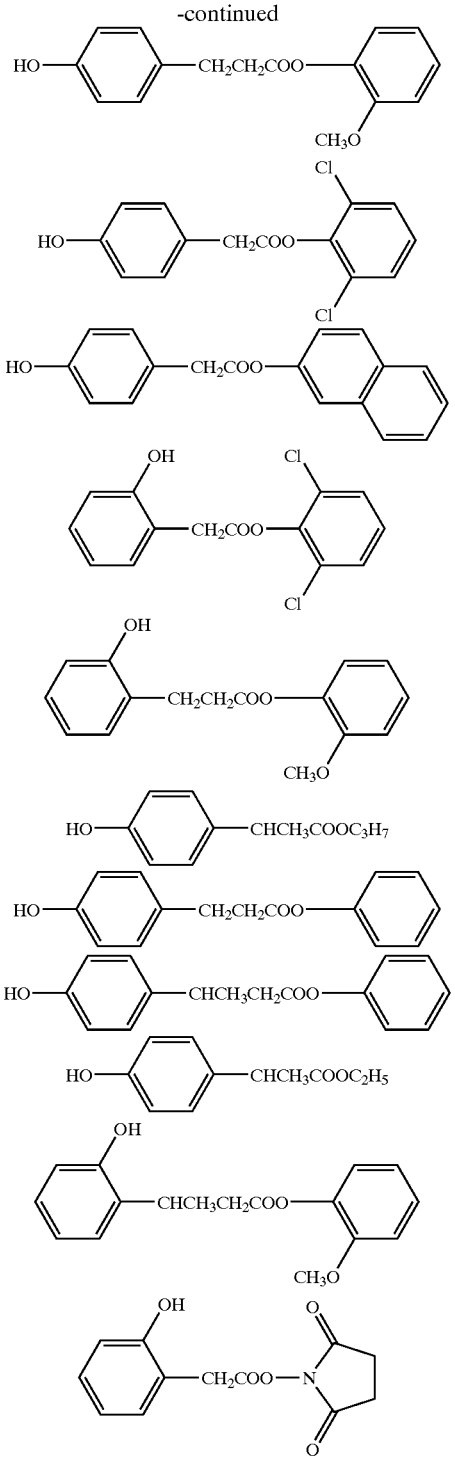

Examples of the compounds of component (c) of the present invention are alcohols, esters, ethers, ketones, carboxylic acids and acid amides. The following is a list of such compounds.

Alcohols are selected from monohydric alcohols to polyhydric alcohols, and their derivatives such as n-octyl alcohol, n-nonyl alcohol, n-decyl alcohol, n-lauryl alcohol, n-myristyl alcohol, n-cetyl alcohol, n-stearyl alcohol, n-eicosyl alcohol, n-docosyl alcohol, n-melisyl alcohol, isocetyl alcohol, isostearly alcohol, isodocosyl alcohol, oleyl alcohol, cyclohexanol, cyclopentanol, benzyl alcohol, cinnamoyl alcohol, ethylene glycol, diethylene glycol, triethylene glycol, polyethylene glycol, propylene glycol, butylene glycol, hexylene glycol, 1,4-cyclohexanediol, 1,2,6-hexanetriol.

Esters can be, for example, amyl acetate, octyl acetate, butyl propionate, octyl propionate, phenyl propionate, ethyl caproate, amyl caproate, ethyl caprylate, amyl caprylate, ethyl pelargonate, butyl pelargonate, hexyl pelargonate, ethyl caprate, amyl caprate, octyl caprate, methyl laurate, ethyl laurate, butyl laurate, hexyl laurate, octyl laurate, dodecyl laurate, cetyl laurate, stearyl laurate, methyl myristate, ethyl myristate, butyl myristate, hexyl myristate, octyl myristate, lauryl myristate, myristyl myristate, cetyl myristate, stearyl myristate, methyl palmitate, ethyl palmitate, butyl palmitate, hexyl palmitate, octyl palmitate, lauryl palmitate, myristyl palmitate, cetyl palmitate, stearyl palmitate, methyl stearate, ethyl stearate, butyl stearate, hexyl stearate, octyl stearate, touryl stearate, myristyl stearate, cetyl stearate, stearyl stearate, methyl behenate, ethyl behenate, propyl behenate, butyl behenate, ethyl benzoate, butyl benzoate, amyl benzoate, phenyl benzoate, ethyl acetoacetate, methyl oleate, butyl oleate, butyl acrylate, diethyl oxalate, dibutyl oxalate, dimethyl malonate, diethyl malonate, dibutyl malonate, dibutyl tartrate, dimethyl cebacate, dibutyl cebacate, dimethyl phthalate, dibutyl phthalate, dioctyl phthalate, dibutyl fumarate, diethyl citrate, triethyl citrate.

Ether can be, for example, diethylene glycol dimethyl ether, diphenyl ether, distearyl ether, butyl ether, hexyl ether, diisopropyl benzyl ether, ethylene glycol dibutyl ether, diethylene glycol dibutyl ether, ethylene glycol diethyl ether, ethylene glycol diphenyl ether, ethylene glycol monophenyl ether.

Ketones can be, for example, diphenyl ketone, distearyl ketone, diethyl ketone, ethyl butyl ketone, methyl hexyl ketone, mesityl oxide, cydohexanone, propiophenone, benzo-phenone, 2,4-pentandione, acetonyl acetone, diacetone alcohol, ketone wax.

Carboxylic acids can be, for example, caproic acid, caprylic acid, capric acid, pelargonic acid, lauric acid, myristic acid, palmitic acid, stearic acid, arachidic add, behenic acid, lignoceric acid, cerotic acid, palmitoleic acid, oleic acid, ricinoleic acid, linoleic acid, linolenic acid, eleostearic acid, erucic acid etc.

Acid amides can be, for example, capryl amide, capric amide, lauryl amide, myristyl amide, palmityl amide, stearo amide, beheno amide, oleino amide, benzamido etc.

The component (d), the stabilizer serving as a ultraviolet absorbers or antioxidants, include the following compounds:

Benzophenone type ultraviolet absorbers such as 2,4-dihydroxybenzophenone, 2-hydroxy-4-methoxybenzophenone, 2,2'-dihydroxy-4,4'-dimethoxybenzophen one, 2,2',4,4'-tetrahydroxybenzophenone, 2-hydroxy-4-methoxybenzophenone-5-sulfonic acid, 2-hydroxy-4-octoxybenzophenone, 2-(2'-hydroxy-3',5'-di-t-amylphenyl) benzophenone, 2-hydroxy-4-dodecyloxy-benzophenone, 2-hydroxy-4-octadecyloxy benzophenone, 2,2'-dihydroxy-4-methoxybenzophenone, 2-hydroxy4-benzyloxy benzophenone.

Salicylic acid type ultraviolet absorber such as phenyl salicylate, p-t-butylphenyl salicylate, p-octylphenyl-salicylate, 2,4-di-t-butylphenyl-4-hydroxybenzoate, 1-hydroxybenzoate, 1-hydroxy-3-t-butyl benzoate, 1-hydroxy-3-t-octylbenzoate, and resorcinol mono benzoate.

Cyanoacrylate type ultraviolet absorbers such as ethyl 2-cyano-3,3'-diphenylacrylate, 2-ethylhexyl 2-cyano-3,3'-diphenylacrylate, 2-ethylhexyl 2-cyano-3-phenyl-cinnamate.

Benzotriazole type ultraviolet absorbers such as 2-(5-t-butyl-2-hydroxyphenyl)benzotriazole, 2-(5-meth-yl-2-hydroxyphenyl) benzotriazole, 2-(3,5-di-t-butyl-2-hydroxyphenyl)benzotriazole, 2-(3-t-butyl-5-methyl-2-hydroxyphenyl)-5-chlorobenzothiazole, 2-(3,5di-t-butyl-2-hydroxyphenyl)-5-chlorobenzothiazole, 2-(3,5-di-t-amyl-2-hydroxyphenyl) -benzotriazole, 2-(3-dodecyl-5-methyl-2-hydroxyphenyl)benzotriazole, 2-(3-t-butyl-5-propyloctylate-2-hydroxyphenyl)-5-chlorobenzothiazole, 2-[2-hydroxyphenyl-3,5,-di-(1,1'-dimethylbenzyl)phenyl]-2H-benzotriazole, 2-(2-hydroxy-5-t-octylphenyl)-2H-benzotriazole, 2-(3-t-butyl-5-octyloxycarboxylethyl-2-hydroxyphenyl)-benzotriazole, 2-(2-hydroxy-5-t-octylphenyl)-benzotriazole, 2-(2-hydroxy4-octoxyphenyl)-benzotriazole, and 2-(2-hydroxy-5-t-butylphenyl)-benzotriazole.

The antioxidant includes hindered amine type antioxidants, phenol type antioxidants, sulfur type antioxidants, and phosphoric acid type antioxidants.

The hindered amine type antioxidants includes dimethyl succinate, 1-(2-hydroxyethyl)-4-hydroxy-2,2,6,6-tetramethylpiperidine polycondensate, poly[{6-(1,1,3,3-tetramethylbutyl)imino-1,3,5-triazine-2,4diyl}{(2,2,6,6-tetramethyl-4-piperidyl)imino}], bis(1,2,2,6,6-pentamethyl-4-piperidyl)2-(3,5-di-t-butyl4-hydroxy-benzyl)-2-n-butyl malonate, N,N'-bis(3-aminopropyl)ethylenediamine/2,4-bis [N-butyl-N-(1,2,2,6,6-pentamethyl-4-piperidyl)amino]-6-chloro-1,3,5-triazine condensate, bis(1,2,2,6,6-pentamethyl-4-piperidyl) sebacate, 4-benzoyloxy-2,2,6,6-tetramethylpiperidine, bis(2,2,6,6-tetramethyl-4-piperidyl) sebacate, and 8-acetyl-3-dodecyl-7,7-9,9-tetramethyl-1,3,8-trioxaspiro[4.5] and decane-2,4-dione.

The phenol type antioxidants specifically include 2,6-di-t-butyl-4-methylphenol, 2-t-butyl-4-methoxyphenol, 2,6-di-t-butyl-4-ethylphenol, 2,2-methylene-bis(4-methyl-6-t-butylphenol), 4,4-thiobis (2-methyl-6-t-butylphenol), 2,2-thiobis(4-methyl-6-t-butylphenol), 4,4-butylidene-bis(3-methyl-6-t-butyl-phenol), 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis[methylene-3-(3,5-di-t-butyl4-hydroxyphenyl) propionate]methane, 2,2-ethylenebis(4,6-di-t-butylphenol), bis[3,3'-bis(4'-hydroxy-3'-t-butylphenyl) butyric acid]glycol ester, 1,3,5-tris(3',5'-di-t-butyl-4'-hydroxybenzyl)-s-triazine-2,4,6-(1H,3H,5H)-trione, tocophenol, 1,3,5-tris(4-t-butyl-3-hydroxy-2,6-dimethylbenzyl)isocyanurate, triethyleneglycol-bis[3-(3-t-butyl-5-methyl-4-hydroxyphenyl)propionate], 1,6-hexanediol-bis[3-(3,5-di-t-butyl-4-hydroxyphenyl) propionate], 2,2-thioethylenebis[3-(3,5-di-t-butyl-4-hydroxyphenyl)propionate], tris(3,5-di-t-butyl-4-hydroxybenzyl) isocyanurate, 2,2,4-trimethyl-1,2-hydroquinone, and 2,5-di-t-butylhydroquinone.

The sulfur type antioxidant specifically includes dilauryl 3,3'-thiodipropionate, dimyristyl 3,3'-thiodipropionate, distearyl 3,3'-thiodipropionate, and stearylthiopropylamide.

The phosphoric acid type antioxidants specifically include tris(2,4-di-t-butylphenyl)phosphite, bis(2,4-di-t-butylphenyl)pentaerythritol diphosphite, 3,5-di-t-butyl-4-hydroxy-benzyl phosphonate diethyl ester, triphenyl phosphite, diphenyl isodecyl phosphite, phenyl isodecyl phosphite, 4,4'-butylidene-bis(3-methyl-6-t-butylphenyl-ditridecyl) phosphite, octadecyl phosphite, tris (nonylphenyl) phosphite, diisodecyl pentaerythritol diphosphite, 10-(3,5-di-t-butyl-4-hydroxybenzyl)-9,10-dihydro-9-oxy-10-phospha-phenant hrene-10-oxide, 10-decyloxy-9,10-dihydro-9-oxy-10-phospha-phenanthrene, cyclic naopentatetrayl-bis(2,4-di-t- butylphenyl)phosphite, cyclic naopentatetrayl-bis(2,6-di-t-butyl-4-methylphenyl) phosphite, 2,2-methylenebis(4,6-di-t-butylphenyl)octyl phosphite, 2,4-bis(n-octylthio)-6-(4-hydroxy-3,5-di-t-butylanilino)-1,3,5-triazine, and octylated diphenylamine.

The weight ratio of each component in the reversible thermochromic composition is generally (a):b):(c):(d)= 1:0.1–100:10–1000:0.1–10, and the preferable range is (a):(b):(c):(d)=1:0.1–50:10–100:0.1–5.

The reversible thermochromic composition is prepared by mixing component (a), component (b), component (c), and component (d) and then heating and dissolving the mixture. However, the reversible thermochromic composition made by the method mentioned above is easily affected by chemical nature of each component, and the coloration-discoloration temperature of the thermochromic composition is also affected by external environment. Therefore, in order to protect the original function of each component in the composition and enhance their usage in various fields, and with the object of making it possible to use various compositions for various thermochromic applications and various metachromic temperatures under the same conditions, the present invention adopts a method of enclosing the reversible thermochromic composition in a microcapsule.

The microcapsule containing the reversible thermochromic composition in the present invention can be manufactured by any known method. For example, microcapsule solution can be prepared by the coacervation method using gelatin, the interfacial polymerization method, the in-situ polymerization method, the in-liquid vulcanization method, and the like.

The microcapsule liquid containing the reversible thermochromic composition can be used as aqueous ink, or as a water base paint. The microcapsule can be used in the form of the powder obtained by filtration, centrifugal separation, and drying of the microcapsule liquid. The microcapsule powder can be used in a heat sensor and a display apparatus for industrial uses. The microcapsule powder can be added into a resin and then be processed to form films, pellets, or filaments adhering to fibers, printing as oil based ink on papers, ceramics, glasses, or fibers through methods such as silk-screening, photogravure, off-set and flexography.

PRODUCTION EXAMPLE 1

1.0 part by weight of CVL, 4.0 parts by weight of 4-hydroxyphenylmethyl acid ethyl ester, 50.0 parts by weight of butyl myristate and 2.0 parts by weight of 2-hydroxy-4-methoxy-benzophenone were heated and dissolved at 130° C. to form a homogeneous mixture, which was then mixed in a mixture solution of 10 parts by weight of AN-119 (trade name; an emulsion agent from Gokyo Co. Ltd. in Japan) and 10 parts by weight of trimethylamine in 45 parts by weight of water. Thereafter, the mixture obtained was dropwise added into 100 parts by weight of an aqueous 10% HP-304 solution (trade name; an amino-alkyl resin available from HOPAX Co. Ltd. in Taiwan) and then stirred to form minute droplets. While keeping the liquid temperature at 90° C., the stirring was continued for about 6 hours to obtain a microcapsule solution. By coating this solution on a sheet of paper, a reversible thermochromic sheet was obtained. The coat weight of microcapsule is 10 g/m$^2$ after drying.

The reversible thermochromic sheet was heated or cooled to measure the temperature of color change (metachromatism). The result of production example 1 was shown in Table 1.

This solution also could be centrifuged to obtain a reversible thermochromic composition.

PRODUCTION EXAMPLES 2 TO 37

The procedure of Production Example I was repeated to obtain reversible thermochromic compositions No. 2 to 37, except the combinations of the components (a) and (c) were changed. The results of compositions and color changes (metachromatism) of these reversible thermochromic compositions No. 2 to 37 were shown in Table 1.

COMPARATIVE EXAMPLES 1 TO 10

The comparisons No. 1 to 10 were prepared in the similar method to production example 1, except for replacing the combination of components (a), (b), (c), and (d). Compositions and color changes were shown in Table 1.

The color densities of some reversible thermochromic sheets were measured by using color difference meter (manufactured by Datacolor International Co.). Consequently, the density difference is depended on the hue. The greater the value, the higher the density indicated. Table 2 also illustrates excellent performance of Formula I in color density compared with Bisphenol A.

TABLE 1

| Example No. | Component (a) | Component (b) | Component (c) | Component (d) | Hue change and Thermochromic temp. |
|---|---|---|---|---|---|
| 1 | CVL | 4-hydroxyphenylmethyl acid ethyl ester | butyl myristate | 2-hydroxy-4-methoxy-benzophenone | blue→colorless (−18° C.) |
| 2 | CVL | 4-hydroxyphenylmethyl acid ethyl ester | butyl oleate | same as example 1 | blue→colorless (−10° C.) |
| 3 | CVL | 4-hydroxyphenylmethyl acid ethyl ester | ethyl oleate | same as example 1 | blue→colorless (−4° C.) |
| 4 | CVL | 4-hydroxyphenylmethyl acid ethyl ester | butyl laurate | same as example 1 | blue→colorless (−13° C.) |
| 5 | CVL | 4-hydroxyphenylmethyl acid ethyl ester | methyl laurate | same as example 1 | blue→colorless (0° C.) |
| 6 | CVL | 4-hydroxyphenylmethyl acid ethyl ester | ethyl stearate | same as example 1 | blue→colorless (28° C.) |
| 7 | CVL | 4-hydroxyphenylmethyl acid ethyl ester | butyl stearate | same as example 1 | blue→colorless (18° C.) |
| 8 | CVL | 4-hydroxyphenylmethyl acid ethyl ester | ethyl caprate | same as example 1 | blue→colorless (−40° C.) |
| 9 | CVL | 4-hydroxyphenylmethyl acid ethyl ester | butyl caprate | same as example 1 | blue→colorless (−48° C.) |
| 10 | CVL | 4-hydroxyphenylmethyl acid ethyl ester | hexyl peralgonate | same as example 1 | blue→colorless (−32° C.) |
| 11 | CVL | 4-hydroxyphenylmethyl acid ethyl ester | ethyl peralgonate | same as example 1 | blue→colorless (−24° C.) |
| 12 | Red-3 | 4-hydroxyphenylmethyl acid ethyl ester | butyl laurate | same as example 1 | pink→colorless (−13° C.) |
| 13 | Red-3 | 4-hydroxyphenylmethyl acid ethyl ester | butyl oleate | same as example 1 | pink→colorless (−12° C.) |
| 14 | Red-3 | 4-hydroxyphenylmethyl acid ethyl ester | ethyl stearate | same as example 1 | pink→colorless (25° C.) |
| 15 | PSD-150 | 4-hydroxyphenylmethyl acid ethyl ester | butyl oleate | same as example 1 | black→colorless (−10° C.) |

TABLE 1-continued

| | Component (a) | Component (b) | Component (c) | Component (d) | Hue change and Thermochromic temp. |
|---|---|---|---|---|---|
| 16 | PSD-150 | 4-hydroxyphenylmethyl acid ethyl ester | methyl laurate | same as example 1 | black→colorless (−1° C.) |
| 17 | PSD-150 | 4-hydroxyphenylmethyl acid ethyl ester | ethyl oleate | same as example 1 | black→colorless (−2° C.) |
| 18 | PSD-V | 4-hydroxyphenylmethyl acid ethyl ester | ethyl myristate | same as example 1 | vermili→colorless (5° C.) |
| 19 | PSD-V | 4-hydroxyphenylmethyl acid ethyl ester | methyl palmitate | same as example 1 | vermili→colorless (23° C.) |
| 20 | PSD-V | 4-hydroxyphenylmethyl acid ethyl ester | methyl myristate | same as example 1 | vermili→colorless (10° C.) |
| 21 | PSD-184 | 4-hydroxyphenylmethyl acid ethyl ester | ethyl caprate | same as example 1 | black→colorless (−42° C.) |
| 22 | PSD-184 | 4-hydroxyphenylmethyl acid ethyl ester | ethyl palmitate | same as example 1 | black→colorless(13° C.) |
| 23 | PSD-184 | 4-hydroxyphenylmethyl acid ethyl ester | butyl peralgonate | same as example 1 | black→colorless (−16° C.) |
| 24 | Black-15 | 4-hydroxyphenylmethyl acid ethyl ester | methyl laurate | same as example 1 | black→colorless (3° C.) |
| 25 | Black-15 | 4-hydroxyphenylmethyl acid ethyl ester | butyl myristate | same as example 1 | black→colorless (−20° C.) |
| 26 | Black-15 | 4-hydroxyphenylmethyl acid ethyl ester | myristyl alcohol | same as example 1 | black→colorless (20° C.) |
| 27 | Blue-63 | 4-hydroxyphenylmethyl acid ethyl ester | stearyl alcohol | same as example 1 | blue→colorless (53° C.) |
| 28 | Blue-63 | 4-hydroxyphenylmethyl acid ethyl ester | cethyl alcohol | same as example 1 | blue→colorless (40° C.) |
| 29 | Blue-63 | 4-hydroxyphenylmethyl acid ethyl ester | lauryl alcohol | same as example 1 | blue→colorless (17° C.) |
| 30 | Blue-63 | 4-hydroxyphenylmethyl acid ethyl ester | lauryl amide | same as example 1 | blue→colorless (78° C.) |
| 31 | Indolyl Red | 4-hydroxyphenylmethyl acid ethyl ester | oleyl amide | same as example 1 | red→colorless (67° C.) |
| 32 | Indolyl Red | 4-hydroxyphenylmethyl acid ethyl ester | stearic acid | same as example 1 | red→colorless (60° C.) |
| 33 | Indolyl Red | 4-hydroxyphenylmethyl acid ethyl ester | lauric acid | same as example 1 | red→colorless (34° C.) |
| 34 | Orange DCF | 4-hydroxyphenylmethyl acid ethyl ester | ethyl stearate | same as example 1 | orange→colorless (27° C.) |
| 35 | Orange DCF | 4-hydroxyphenylmethyl acid ethyl ester | butyl palmitate | same as example 1 | orange→colorless (7° C.) |
| 36 | Y-1 | 4-hydroxyphenylmethyl acid ethyl ester | ethyl oleate | same as example 1 | yellow→colorless (−3° C.) |
| 37 | Y-1 | 4-hydroxyphenylmethyl acid ethyl ester | butyl stearate | same as example 1 | yellow→colorless (17° C.) |

| Comparison No. | Component (a) | Component (b) | Component (c) | Component (d) | Hue change and Thermochromic temp. |
|---|---|---|---|---|---|
| 1 | CVL | Bisphenol A | methyl myristate | 2-hydroxy-4-methoxy-benzophenone | blue→colorless (10° C.) |
| 2 | Red-3 | Bisphenol A | methyl myristate | same as example 1 | pink→colorless (8° C.) |
| 3 | PSD-150 | Bisphenol A | methyl myristate | same as example 1 | black→colorless (10° C.) |
| 4 | PSD-V | Bisphenol A | methyl myristate | same as example 1 | vermili→colorless (12° C.) |
| 5 | PSD-184 | Bisphenol A | methyl myristate | same as example 1 | black→colorless (10° C.) |
| 6 | Black-15 | Bisphenol A | methyl myristate | same as example 1 | black→colorless (9° C.) |
| 7 | Blue-63 | Bisphenol A | methyl myristate | same as example 1 | blue→colorless (8° C.) |
| 8 | Indolyl Red | Bisphenol A | methyl myristate | same as example 1 | red→colorless (7° C.) |
| 9 | Orange DCF | Bisphenol A | methyl myristate | same as example 1 | orange→colorless (8° C.) |
| 10 | Y-1 | Bisphenol A | methyl myristate | same as example 1 | yellow→colorless (8° C.) |

CVL: Crystal Violet Lactone of Phthalide compounds
Black-15: Fluoran compound
Red-3: Fluoran compound
PSD-150: Fluoran compound
PSD-V: Fluoran compound
PSD-184: Fluoran compound
Blue-63: Fluoran compound
Indolyl Red: Phthalide compound
Orange DCF: Fluoran compound
Y-1: Fluoran compound

TABLE 2

| Example No. | Component (a) | Component (b) | Component (c) | Component (d) | Hue and color density. |
|---|---|---|---|---|---|
| 1 | CVL | 4-hydroxyphenylmethyl acid ethyl ester | butyl myristate | 2-hydroxy-4-methoxy-benzophenone | blue 1.13 |
| 2 | Red-3 | 4-hydroxyphenylmethyl acid ethyl ester | ethyl stearate | same as example 1 | pink 1.50 |
| 3 | PSD-150 | 4-hydroxyphenylmethyl acid ethyl ester | butyl oleate | same as example 1 | black 1.31 |
| 4 | PSD-V | 4-hydroxyphenylmethyl acid ethyl ester | methyl myristate | same as example 1 | vermili 1.35 |
| 5 | PSD-184 | 4-hydroxyphenylmethyl acid ethyl ester | ethyl caprate | same as example 1 | black 1.26 |
| 6 | Black-15 | 4-hydroxyphenylmethyl acid ethyl ester | | same as example 1 | black 1.18 |
| 7 | Blue-63 | 4-hydroxyphenylmethyl acid ethyl ester | | same as example 1 | blue 1.22 |
| 8 | Indolyl Red | 4-hydroxyphenylmethyl acid ethyl ester | | same as example 1 | red 1.32 |
| 9 | Orange DCF | 4-hydroxyphenylmethyl acid ethyl ester | | same as example 1 | orange 1.19 |
| 10 | Y-1 | 4-hydroxyphenylmethyl acid ethyl ester | | same as example 1 | yellow 1.28 |

| Comparison No. | Component (a) | Component (b) | Component (c) | Component (d) | Hue and color density. |
|---|---|---|---|---|---|
| 11 | CVL | Bisphenol A | methyl myristate | same as example 1 | blue 0.64 |
| 12 | Red-3 | Bisphenol A | methyl myristate | same as example 1 | pink 0.72 |
| 13 | PSD-150 | Bisphenol A | methyl myristate | same as example 1 | black 0.65 |
| 14 | PSD-V | Bisphenol A | methyl myristate | same as example 1 | vermili 0.68 |
| 15 | PSD-184 | Bisphenol A | methyl myristate | same as example 1 | black 0.59 |
| 16 | Black-15 | Bisphenol A | methyl myristate | same as example 1 | black 0.52 |
| 17 | Blue-63 | Bisphenol A | methyl myristate | same as example 1 | blue 0.65 |
| 18 | Indolyl Red | Bisphenol A | methyl myristate | same as example 1 | red 0.77 |

TABLE 2-continued

| 19 | Orange DCF | Bisphenol A | methyl myristate | same as example 1 | orange 0.61 |
| 20 | Y-1 | Bisphenol A | methyl myristate | same as example 1 | yellow 0.63 |

CVL: Crystal Violet Lactone of Phthalide compounds
Red-3: Fluoran compound
PSD-150: Fluoran compound
PSD-V: Fluoran compound
PSD-184: Fluoran compound
Black-15: Fluoran compound
Blue-63: Fluoran compound
Indolyl Red: Phthalide compound
Orange DCF: Fluoran compound
Y-1: Fluoran compound It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A reversible thermochromic composition, comprising:
   (a) an electron-donating color former;
   (b) an electron-accepting compound represented by Formula I

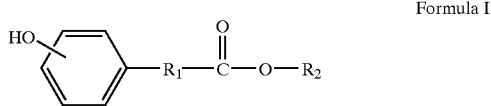

Formula I wherein $R_1$ represents a straight-chain or a branch-chain alkyl group having 1 to 3 carbon atoms, $R_2$ represents an alkyl group, an aromatic group or a heterocyclic group having 1 to 14 carbon atoms;
   (c) a solvent including alcohol, ester, ether, ketone, carboxylic acid or acid amide; and
   (d) a light stabilizer for serving as ultraviolet absorbers or antioxidants.

2. The reversible thermochromic composition of claim 1, wherein weight ratio of (a):(b):(c):(d) is about 1:0.1–100:10–1000:0.1–10.

3. The reversible thermochromic composition of claim 1, wherein weight ratio of (a):(b):(c):(d) is about 1:0.1–50:10–100:0.1–5.

4. The reversible thermochromic composition of claim 1, which undergoes reversible metachromatism at a temperature within the range of –50° C. to 100° C.

5. A reversible thermochromic composition, comprising:
   (a) an electron-donating color former;
   (b) an electron-accepting compound represented by Formula I

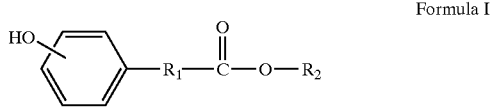

Formula I wherein $R_1$ represents a straight-chain alkyl group having 1 to 3 carbon atoms, $R_2$ represents an alkyl group having 1 to 14 carbon atoms;
   (c) a solvent including alcohol, ester, ether, ketone, carboxylic acid or acid amide; and
   (d) a light stabilizer for serving as ultraviolet absorbers or antioxidants.

6. The reversible thermochromic composition of claim 5, wherein the $R_1$ is a branch-chain alkyl group.

7. The reversible thermochromic composition of claim 5, wherein the $R_2$ is an aromatic group or a heterocyclic group.

8. The reversible thermochromic composition of claim 5, The reversible thermochromic composition of claim 1, wherein weight ratio of (a):(b):(c) (d) is about 1:0.1–100:10–1000:0.1–10.

9. The reversible thermochromic composition of claim 5, wherein weight ratio of (a):(b):(c):(d) is about 1:0.1–50:10–100:0.1–5.

10. The reversible thermochromic composition of claim 5, which undergoes reversible metachromatism at a temperature within the range of –50° C. to 100° C.

11. A reversible thermochromic composition, comprising:
    (a) an electron-donating color former;
    (b) an electron-accepting compound represented by Formula I

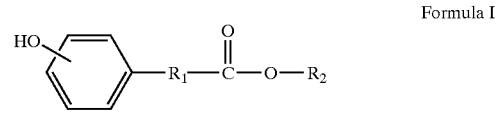

Formula I wherein $R_1$ represents an alkyl group, $R_2$ represents an alkyl group, a phenyl group, or a cyclic group;
    (c) a solvent; and (d) a light stabilizer.

12. The reversible thermochromic composition of claim 11, wherein the $R_1$ comprises a straight-chain or a branch-chain alkyl group.

13. The reversible thermochromic composition of claim 11, wherein the $R_1$ has 1–3 carbon atoms.

14. The reversible thermochromic composition of claim 11, wherein the $R_2$ comprises an aromatic group or a heterocyclic group.

15. The reversible thermochromic composition of claim 11, wherein the $R_2$ has 1–14 carbon atoms.

16. The reversible thermochromic composition of claim 11, wherein weight ratio of (a):(b):(c):(d) is about 1:0.1–100:10–1000:0.1–10.

17. The reversible thermochromic composition of claim 11, wherein weight ratio of (a):(b):(c):(d) is about 1:0.1–50:10–100:0.1–5.

18. The reversible thermochromic composition of claim 1, which undergoes reversible metachromatism at a temperature within the range of –50° C. to 100° C.

* * * * *